US007977891B2

(12) United States Patent
Shiu et al.

(10) Patent No.: US 7,977,891 B2
(45) Date of Patent: Jul. 12, 2011

(54) LED DRIVING CIRCUIT

(75) Inventors: Shian-Sung Shiu, Yonghe (TW); Chung-Che Yu, Yonghe (TW)

(73) Assignee: Green Solution Technology Co., Ltd., Taipei County (TW)

( * ) Notice: Subject to any disclaimer, the term of this patent is extended or adjusted under 35 U.S.C. 154(b) by 312 days.

(21) Appl. No.: 12/379,841

(22) Filed: Mar. 3, 2009

(65) Prior Publication Data

US 2010/0084983 A1 Apr. 8, 2010

(30) Foreign Application Priority Data

Oct. 7, 2008 (TW) ............................... 97217887 U

(51) Int. Cl.
*G05F 1/00* (2006.01)

(52) U.S. Cl. ........ 315/291; 315/294; 315/308; 315/224; 315/312; 345/46; 345/82; 345/77; 345/204; 345/212

(58) Field of Classification Search .................. 315/291, 315/294, 224, 300, 307, 308, 312, 185 R; 345/46, 82, 77, 102, 204, 211, 212
See application file for complete search history.

(56) References Cited

U.S. PATENT DOCUMENTS

| | | | | |
|---|---|---|---|---|
| 7,317,403 | B2 * | 1/2008 | Grootes et al. | 340/815.45 |
| 7,425,943 | B2 * | 9/2008 | Furukawa | 345/102 |
| 7,855,520 | B2 * | 12/2010 | Leng | 315/307 |
| 7,888,888 | B2 * | 2/2011 | Huang et al. | 315/307 |
| 2006/0082538 | A1 * | 4/2006 | Oyama | 345/102 |
| 2006/0290625 | A1 * | 12/2006 | Sugimoto | 345/83 |
| 2009/0322235 | A1 * | 12/2009 | Shiu et al. | 315/185 R |

* cited by examiner

*Primary Examiner* — Haissa Philogene
(74) *Attorney, Agent, or Firm* — Rosenberg, Klein & Lee

(57) ABSTRACT

An LED driving circuit is provided for driving an LED module, comprising a transistor switch and a feedback controller. The transistor switch has a control terminal, a first terminal, and a second terminal. The first terminal is coupled to the LED module and the control terminal receives a control signal for controlling a current passing through the transistor switch. The feedback controller receives a reference voltage and a current detecting signal indicative of the magnitude of the current and generates the control signal accordingly. The feedback controller is connected to a driving power source with level higher than the level of the first terminal of the transistor switch. Hence, the maximum level of an adjustable range of the control signal is higher than the first terminal of the transistor switch.

7 Claims, 2 Drawing Sheets

LED DRIVING CIRCUIT

BACKGROUND OF THE INVENTION

1. Field of the Invention

The present invention relates to a Light Emitting Diode (LED) driving circuit; in particular, to a LED driving circuit driven by constant current.

2. Description of Related Art

Referring to FIG. 1, which shows a prior art LED driving device. The LED driving device comprises a constant current driver 10, a power supply 20, an LED module 30, and a current detecting resistor R. The constant current driver 10 comprises an error amplifier 12 and a transistor switch 14. The power supply 20 provides a driving current flowing through the LED module 30, the constant current driver 10, and the current detecting resistor R. The current detecting resistor R generates a current detecting signal indicating the magnitude of the driving current. An inverting terminal of the error amplifier 12 receives the current detecting signal, and a non-inverting terminal of the error amplifier 12 receives a reference voltage Vr, so that the error amplifier 12 may output a driving signal based on the current detecting signal and the reference voltage Vr. The transistor switch 14 includes a drain D, a source S, and a gate G, wherein the drain D is coupled to the LED module 30, the source S is coupled to the current detecting resistor R, while the gate G receives the aforementioned driving signal. The error amplifier 12 adjusts the level of the driving signal based on the current detecting signal and the reference voltage Vr, so as to modify the equivalent resistance of the transistor switch 14, thus allowing the level of the current detecting signal to be equal to the level of the reference voltage Vr, thereby achieving the objective of constant current.

The power source terminal of the conventional error amplifier 12 is connected to the drain D of the transistor switch 14, and therefore the highest level of the outputted driving signal thereof is the level of the drain D. In order to prevent poor performance in the LED driving device, the level of the drain D should not be overly high, and the maximum load current of the transistor switch 14 is accordingly restricted. In case that the LED driving device needs to be driven with greater current, and the level of the driving signal outputted by the error amplifier 12 is to be limited under the level of the drain D, it is inevitable to enlarge the die size of the transistor switch 14, causing undesirable increase in the cost of the constant current driver.

SUMMARY OF THE INVENTION

In view of the aforementioned issues in prior art, the present invention can raise the upper limit for the level of the driving signal for driving the transistor switch in the LED driving circuit, such that the maximum load current of the transistor switch is accordingly increase. Compared with prior art, the present invention can use the transistor switch of smaller die size to satisfy the same driving current request, thereby effectively reducing circuit cost.

To achieve the advantages described as above, the present invention provides an LED driving circuit for driving an LED module, comprising a transistor switch and a feedback controller. The transistor switch has a control terminal, a first terminal, and a second terminal, wherein the first terminal is coupled to the LED module, and the control terminal receives a control signal to control the magnitude of the current flowing through the transistor switch. The feedback controller receives a reference voltage and a current detecting signal indicating the magnitude of the current, and generates the control signal based on the reference voltage and the current detecting signal; wherein the feedback controller is connected to a driving power source, and the level of the driving power source is higher than that of the first terminal of the transistor switch, such that the maximum level of an adjustable range the control signal is higher than the level of the first terminal of the transistor switch.

Compared with prior art, the driving power source of the feedback controller of the present invention is coupled to another higher voltage source, rather than to the drain of the transistor switch. As a result, the maximum load current of the transistor switch is no longer limited by the level of the drain, but may be, according to the requirement of circuit application, externally connected to an appropriate voltage power source, or alternatively the driving power source coupling of the feedback controller may be even directly connected to a connecting point in the LED module without additionally providing a voltage power source.

The aforementioned summary and following detailed descriptions are simply exemplary in order to facilitate further understanding of the scope of the present invention. Other objectives and advantages of the present invention will be set forth at length in the descriptions and appended drawings illustrated hereunder.

DETAILED DESCRIPTION OF PREFERRED EMBODIMENTS

The current formula of Metal Oxide Semiconductor Field Effect Transistor (MOSFET) can be shown as below:

$$Id = \frac{1}{2}\mu_0 C_{ox}\frac{W}{L}(V_{gs} - V_t)^2$$

Accordingly, to increase current while maintaining the W/L ratio at the same time; that is, without enlarging the die size (W) of the transistor, it is required to raise the gate-source voltage Vgs.

Figure 1:
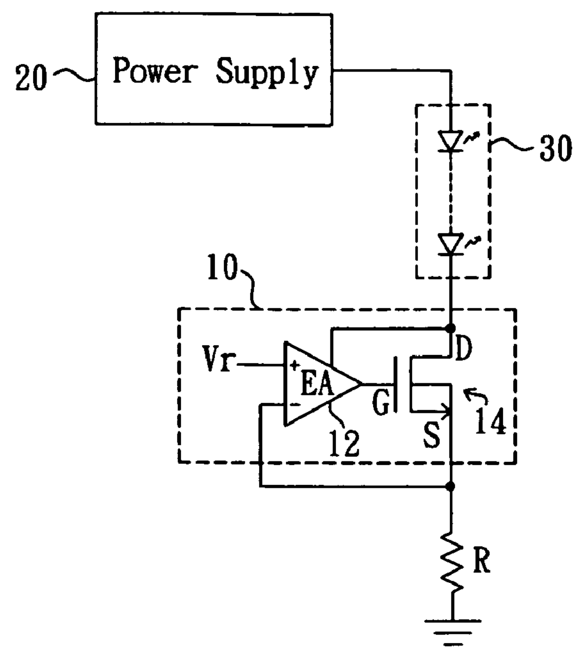
FIG. 1 is a prior art Light Emitting Diode (LED) driving device.
Figure 2:
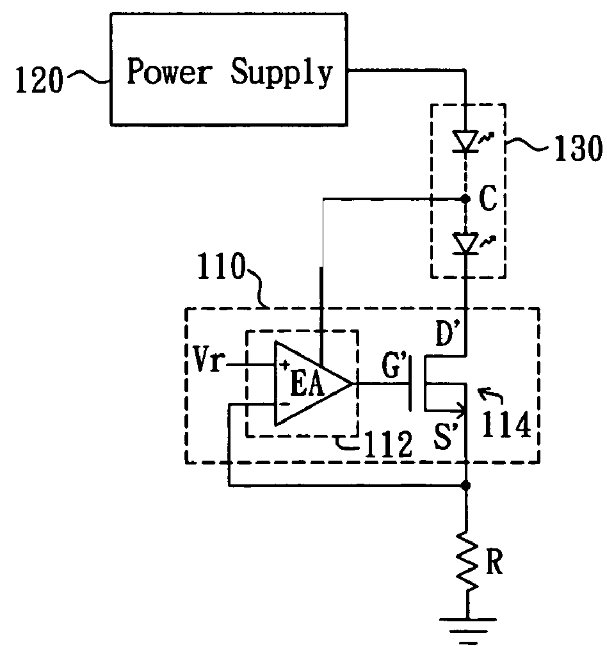
FIG. 2 shows a circuit diagram for an LED driving device of a preferred embodiment according to the present invention.

Refer now to FIG. 2, a circuit diagram for an LED driving device of a preferred embodiment according to the present invention is shown. The depicted LED driving device comprises a constant current driver 110, a power supply 120, an LED module 130, and a current detecting resistor R. The constant current driver 110 comprises a feedback controller 112 and a transistor switch 114. The power supply 120 provides a driving current flowing through the LED module 130, the constant current driver 110, and the current detecting resistor R, in which the current detecting resistor R generates a current detecting signal indicating the magnitude of the driving current. The transistor switch 114 has a control terminal G', a first terminal D', and a second terminal S', wherein the first terminal D' is coupled to the LED module 130, the second terminal S' is coupled to the current detecting resistor R, and the control terminal G' receives a control signal generated by the feedback controller 112 to control the current flowing through the transistor switch 114. The current from the LED module 130 flows through the transistor switch 114 and the current detecting resistor R, thereby generating a current detecting signal indicating the magnitude of the current at the connecting point of the transistor switch 114 and the current detecting resistor R.

The feedback controller 112 comprises an error amplifier (EA) coupled to the current detecting resistor R and the transistor switch 114. The feedback controller 112 receives a reference voltage Vr and the current detecting signal and adjusts the level of the control signal accordingly, such that the current flowing through the transistor switch 114 is stabilized at a prescribed value. In the present embodiment, the feedback controller 112 is coupled to a connecting point C of the LED module 130, and uses a voltage provided at the connecting point C as the driving voltage for the feedback controller 112. Since the connecting point C is separated from the first terminal D' of the transistor switch 114 by at least one LED, the level at the connecting point C is higher than that at the first terminal D' of the transistor switch 114; and thus compared with prior art, the feedback controller 112 can provide a control signal of higher level, accordingly raising the maximum of the gate-source voltage Vgs, further increasing the maximum load current of the transistor switch 114.

Figure 3:
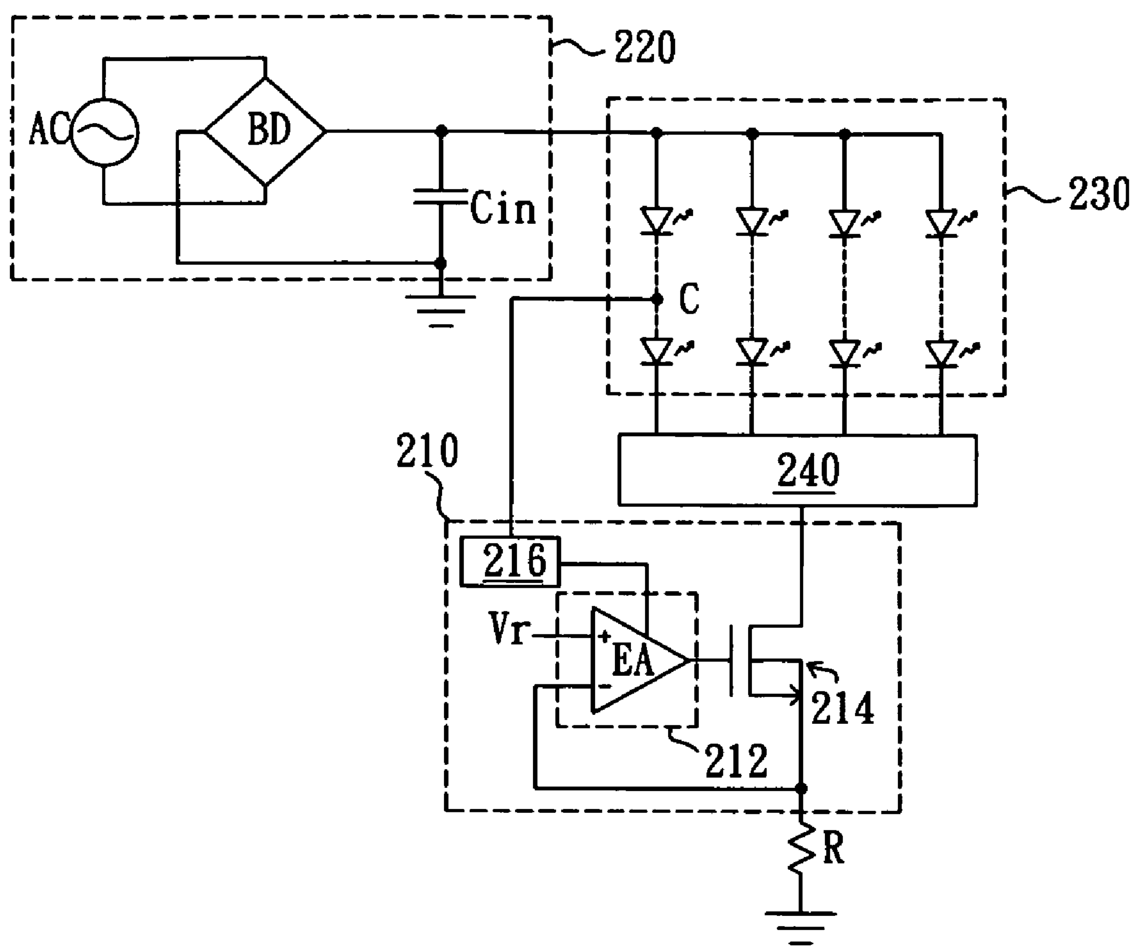
FIG. 3 shows a circuit diagram for an LED driving device of another preferred embodiment according to the present invention.

Additionally, the LED driving device according to the present invention is also applicable to drive multiple LED strings. Refer now to FIG. 3, a circuit diagram for an LED driving device of another preferred embodiment according to the present invention is shown. The depicted LED driving device comprises a constant current driver 210, a power supply 220, an LED module 230, a current equalizer 240, and a current detecting resistor R. The constant current driver 210 comprises a feedback controller 212, and a transistor switch 214. The power supply 220 comprises an alternative current power source AC, a bridge rectifier BD, and a filter Cin to provide driving current flowing through the LED module 230, the constant current driver 210, and the current detecting resistor R, wherein the current detecting resistor R generates a current detecting signal indicating the magnitude of the driving current. The transistor switch 214 receives a control signal generated by the feedback controller 212 to control the current flowing through. The feedback controller 212 comprises an error amplifier EA, and is coupled to the resistor R and transistor switch 214, so as to receive a reference voltage Vr and current detecting signal to adjust the level of the control signal accordingly, allowing the current flowing through the transistor switch 214 to be stabilized at a prescribed value.

Since the LED module 230 comprises multiple LED strings, in order to allow approximately equal current to respectively flow through each LED string, there between the transistor switch 214 and the LED module 230 installs the current equalizer 240 for evenly equalizing the current flowing through each LED string in the LED module. Since the power of the power supply 220 is generated from rectified AC power, it provides an electric power with a frequency double the frequency of the AC power. As to certain types of feedback controllers 212 which require higher stability in the voltage of driving power source, a pre-regulator 216 can be optionally placed between the connecting point C and the feedback controller 212, so as to avoid that the AC signal from the power supply 220 may undesirably affect the control signal generated by the feedback controller 212.

Furthermore, the feedback controller 112, 212, in addition to the LED module 130, 230 with higher driving voltage, may be also coupled to other voltage power source so as to achieve the same advantage, and also the reference voltage can be externally supplied, allowing even wider range of application.

The present invention has been disclosed through the preferred embodiments thereof as set forth hereinbefore, but those skilled in the art can appreciate that such embodiments simply provide illustrations of the present invention, rather than being interpreted as limiting the scope thereof. It is noted that all effectively equivalent changes, modifications, and substitutions made to those disclosed embodiments are deemed to be encompassed within the scope of the present invention. Therefore, the scope of the present invention to be legally protected should be delineated by the following claims.

What is claimed is:

1. An LED driving circuit for driving an LED module, comprising:

a transistor switch, which has a control terminal, a first terminal and a second terminal, in which the first terminal is coupled to the LED module, and the control terminal receives a control signal to control the magnitude of a current flowing through the transistor switch; and a feedback controller, which receives a reference voltage and a current detecting signal indicating the magnitude of the current, and generates the control signal based on the reference voltage and the current detecting signal; wherein the feedback controller is connected to a driving power source, and the level of the driving power source is higher than the one of the first terminal of the transistor switch, such that the maximum level of an adjustable range of the control signal is higher than the level of the first terminal of the transistor switch.

2. The LED driving circuit according to claim 1, wherein the driving power source is provided by the LED module.

3. The LED driving circuit according to claim 1, further comprising a pre-regulator coupled between the driving power source and the feedback controller.

4. The LED driving circuit according to claim 1, wherein the second terminal of the transistor switch is coupled to a current detecting resistor to generate the detecting current.

5. The LED driving circuit according to claim 1, wherein the feedback controller comprises an error amplifier.

6. The LED driving circuit according to claim 1, wherein the LED module comprises multiple LED strings.

7. The LED driving circuit according to claim 6, wherein the transistor switch is coupled to a current equalizer for evenly equalizing a current flowing through each LED string in the LED module.

* * * * *